Feb. 5, 1952 E. FROWE 2,584,571
MAGNETOMETER
Filed Feb. 24, 1948 3 Sheets-Sheet 1

EUGENE FROWE
INVENTOR.

BY Lester B. Clark
 & Ray L. Smith
ATTORNEYS

Feb. 5, 1952          E. FROWE              2,584,571
                      MAGNETOMETER
Filed Feb. 24, 1948                    3 Sheets-Sheet 2

EUGENE FROWE
    INVENTOR.
BY Lester B. Clark
   & Ray L. Smith
              ATTORNEYS Feb. 5, 1952     E. FROWE     2,584,571
MAGNETOMETER Filed Feb. 24, 1948     3 Sheets-Sheet 3

EUGENE FROWE
INVENTOR.

BY *Lester B. Clark*
*Ray L. Smith*

ATTORNEYS

Patented Feb. 5, 1952

2,584,571

UNITED STATES PATENT OFFICE 2,584,571

MAGNETOMETER

Eugene Frowe, Houston, Tex., assignor to Robert
H. Ray Co., a partnership

Application February 24, 1948, Serial No. 10,271

11 Claims. (Cl. 175—183)

This invention relates to the measurement of a magnetic field and it particularly is concerned with the measurement of variations in the terrestrial field from point to point to indicate anomalies indicative of conditions existing at or near the earth's surface or within the water which covers portions of the earth's surface.

The invention is of particular utility in locating anomalies in earth formations favorable to the location of valuable deposits such as ores, coal, oil, gas, sulphur, and the like. It is known that measurements of terrestrial magnetism of areas of the earth's surface, and particularly variations thereof, provide information concerning sub-surface geological structures and also submerged surface contours as well as submerged bodies. However equipment and techniques heretofore used have been slow and laborious when making such measurements. The present invention seeks to expedite measuring operations and to this end comprehends method and apparatus whereby measurements can be made continuously or intermittently as measuring equipment is transported along predetermined courses, as by land vehicle, aircraft, or by a vessel upon or within the submerging medium of water covered areas.

The primary object of the invention is to provide novel equipment and technique of which the former lends itself to portability while at the same time maintaining such high degree of accuracy in measurements that even minor anomalies are made apparent.

Another object is to provide apparatus in which the total terrestrial magnetic field is utilized at all times.

Still another object is to provide magnetometer having an inductor which is oscillated so that the inductor elements thereof move at all times substantially transversely to the direction of the field being measured.

A still further object is to provide an inductor and cooperating mechanisms for constantly orienting the inductor so that the elements thereof will move at right angles to the direction of the total terrestrial field at the point at which an observation is being made.

It is also an object to provide an inductor and orienting means therefor together with additional means for completely neutralizing the terrestrial field at the point of location of the inductor.

Still another object is to provide indicating means for measuring the variations in the energy necessary to effect neutralization of the terrestrial field, such variations in energy being indicative of anomalous conditions giving rise thereto and hence providing information concerning sub-surface geological structure.

While the invention is primarily concerned with the expeditious procurement of accurate measurements of terrestrial magnetism as an indication of the location of valuable sub-surface deposits, it is also of utility in locating submerged contours of objects, including sunken ships, submarines, or the like. It is therefore another object of the invention to provide an efficient instrumentality for accomplishing these purposes.

Still another and more specific object of the invention is to provide a mobile magnetometer providing a three-element inductor in which two elements are used to orient the third which in turn provides measurement of the total magnetic field.

The foregoing objects, together with other objects and advantages of the invention will be more fully apparent from the following description considered in connection with the accompanying drawings in which.

Figure 1:
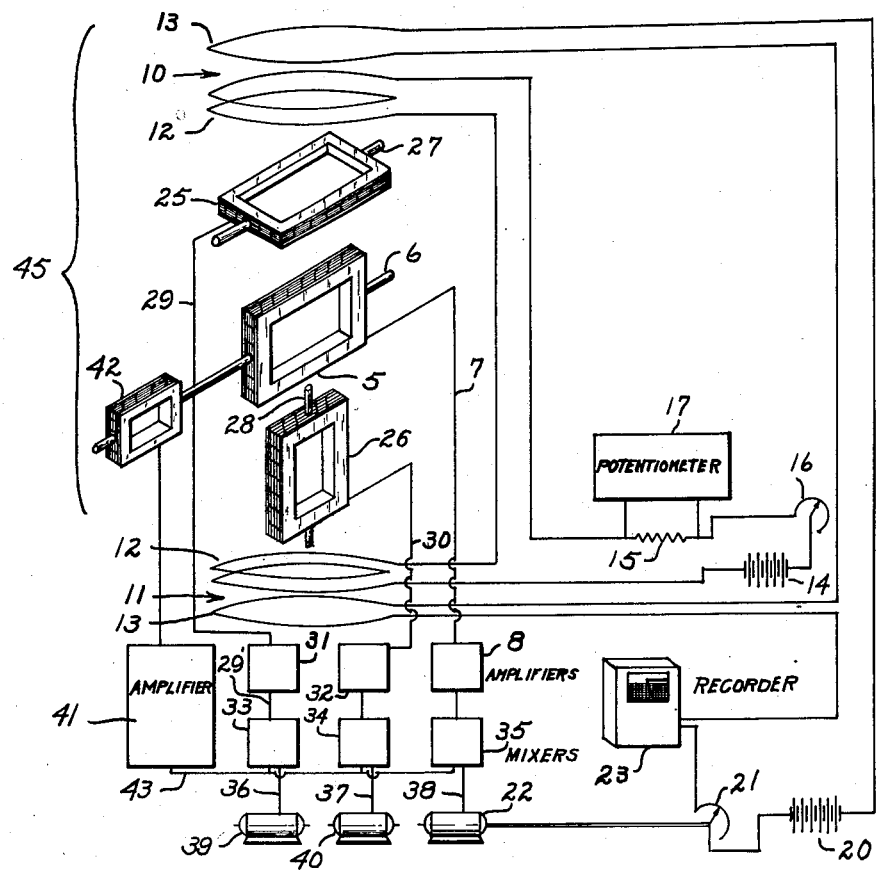
Fig. 1 is a schematic diagram, with certain elements in perspective, illustrating one embodiment of the invention.

Referring first to Fig. 1 there is shown an inductor 5 which is movable about the axis or shaft 6. This inductor comprises a plurality of turns of insulated conductor and it may be vibrated or oscillated in the magnetic field to be measured. In such a manner an electromotive force is generated in the inductor, as is well known, and such electromotive force is supplied through the conductors shown at 7 to an amplifier 8. Preferably the inductor 5 is oscillated about the axis 6 through a small angle whereby the turns of the inductor move successively in opposite directions and transversely of the magnetic field to be measured. This manner of moving the inductor 5 provides desired results and eliminates the use of collector rings and attendant difficulties.

The apparatus is intended to be of the null type and to this end there are provided Helmholtz coils 10, 11 above and below the inductor 5. Each of these coils comprises a principal coil 12 and a supplemental coil 13. The coils 12 are connected series aiding and are supplied with energy from the battery 14 through resistor 15 and rheostat 16 whereby the current supplied can be carefully controlled. To provide for accurate measurement and control of this current a potentiometer 17 measures the voltage drop across the resistor 15.

Supplemental coils 13 of the Helmholtz coils are also connected series aiding to supplement the neutralizing effect of the coils 12 and are supplied with current from the battery 20 which current also passes through the rheostat 21 of which the resistance in the circuit is controlled by the field motor 22. The current flowing in this circuit is indicated or recorded by the recorder 23.

It seems apparent that by a predetermined adjustment of the current supplied to the principal coils 12 and coordinated adjustment of the current to the coils 13, a magnetic field may be created to neutralize the earth's field at and proximate the point of location of the inductor 5. Furthermore, any point-to-point variation in the earth's field that will cause a departure from complete neutralization may be offset by a change in the current in the circuit of the supplemental coils 13. The amount of such change will be reflected by the change in the indicator or recorder instrument 23.

The Helmholtz coils 10, 11 also neutralize the earth's field in the field coils 25, 26 proximate the inductor 5 and mounted to vibrate or oscillate about axes 27, 28 which are respectively parallel with and at right angles to the axis 6 of the inductor 5. Inasmuch as the axis 27 of the coil 25 lies in a common plane with the axis 6 of the inductor 5, as a practical matter in the device as hereinafter described in connection with Figs. 2 to 5, inclusive, this coil is mounted upon the axis 6 but is shown upon a separate axis in Fig. 1 of the drawing to more clearly illustrate the principle of the invention.

Field coils 25, 26 are preferably oscillatable at a small angle to planes which extend transversely of the earth's total magnetic field to be measured.

If the output of the inductor 5 is zero and at the same time the output of each of the field coils 26, 27 is also zero, the total earth's field is fully neutralized by the Helmholtz coils 10, 11 and the inductor and coils are properly oriented in alignment with the total earth's field. Thus the recorder 23 indicates the strength of the earth's magnetic field at that point and any change in indication by the recorder is a measure of change in the strength of the earth's magnetic field as the device is moved from one point to another.

Manual adjustments could of course be effected to obtain complete neutralization of the earth's field and proper orientation of the coils relative to such field to obtain indications of the strength of the earth's field and variations thereof, as the instrument is moved from point to point. Such operation is, however, impractical for expeditious and highly accurate work and hence, in accordance with the invention, means are provided for effecting necessary adjustments whereby automatic operation is effected. To this end the outputs of the field coils 25, 26 are supplied through paired conductors indicated at 29, 30 to amplifiers 31 and 32 respectively. Obviously it is the purpose of these amplifiers and the amplifier 8 as well to greatly amplify the electromotive force supplied thereto from the field coils 25, 26 and the inductor 5. The outputs of the amplifiers comprises the control input to mixer circuits 33, 34, and 35 from which power is supplied through lines 36, 37, and 38 to reversible motors 39, 40, and 22 respectively.

The mixer circuits 33, 34 and 35 may be of any suitable and well-known construction such, for example, as gas filled triodes connected push-pull and supplied from and controlled by energy from power supply amplifier 41 of which the input comprises the electromotive force generated in phasing coil 42.

Figure 6:
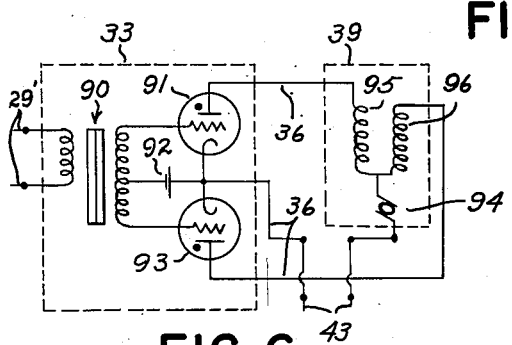
Fig. 6 is a circuit diagram of a mixer circuit which may be used as an element of the invention.
Figure 2:
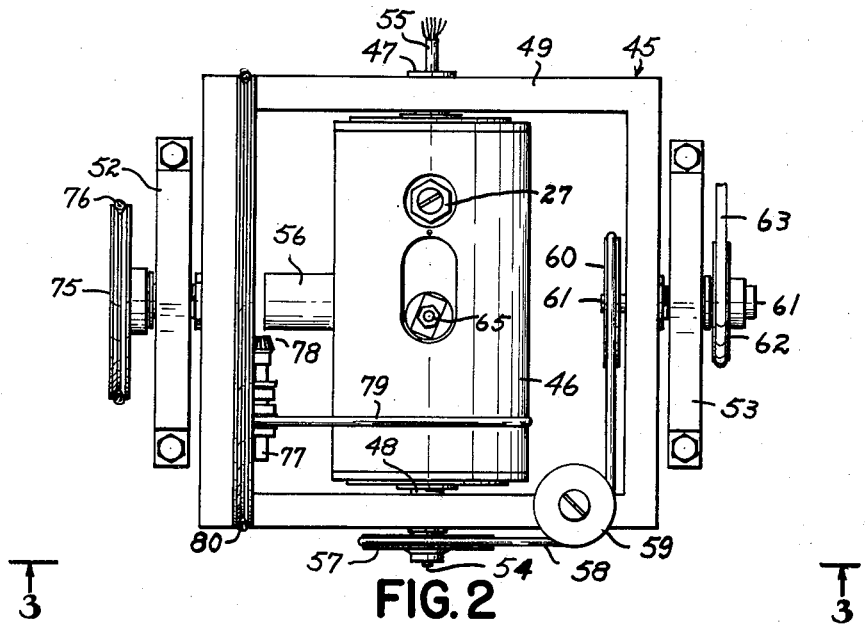
Fig. 2 is a plan view of an embodiment of the invention.
Figure 3:
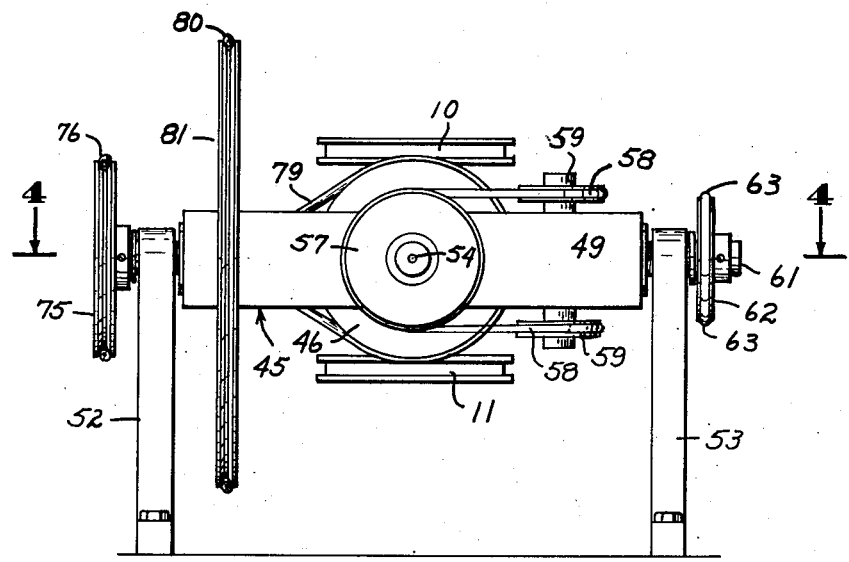
Fig. 3 is a front elevational view of the device taken on line 3—3 in Fig. 2.
Figure 4:
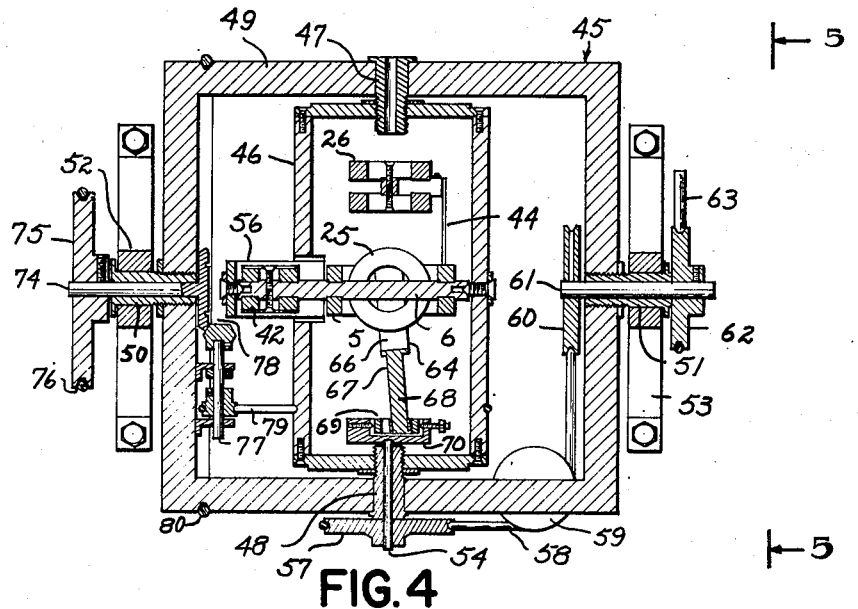
Fig. 4 is a sectional view through the device taken on line 4—4 in Fig. 3.
Figure 5:
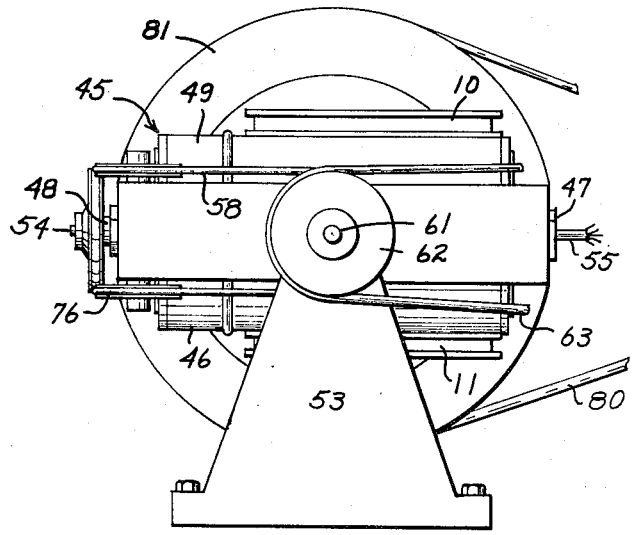
Fig. 5 is a side elevational view, taken on line 5—5 in Fig. 4.

Such a circuit is shown in Fig. 6 as the mixer 33 and associated motor 39, it being understood that the same mixer circuit, or equivalent, may be used for the mixers 34 and 35 and the motors 40 and 22. The output from the amplifier 31 is transmitted through the line 29' to the primary of the transformer 90 whose secondary is connected to the grids of the gas filled triodes 91 and 93, a center tap of the secondary being connected through a battery 92 to the cathodes of the triodes.

One conductor of the output line 43 from the amplifier 41 is connected to the cathodes of the triodes 91 and 93, and the other conductor is connected to the armature 94 and thence to the oppositely wound fields 95 and 96 of the motor 39. The other ends of these fields are connected directly to the plates of the tubes 91 and 93. It seems apparent that the application of electromotive force of the proper sense, or phase, from the amplifier 41 to the mixer and thence to the motor 39 will bring about desired operation of the motor so that the inductor 5 will be maintained substantially in the plane of the earth's magnetic field as will be more fully described.

In the practical embodiment of the invention to be more fully described, the coils 5, 25, and 26 are mounted in a housing in the relative positions shown, such housing being mounted for universal movement so that it may be maintained in such position that oscillation of the coils will cause the inductors thereof to cut the residual of the earth's total magnetic field substantially at right angles. The reversible motors 39 and 40 are utilized to move such housing to maintain required alignment thereof with the earth's field.

The electromotive force induced in the phasing coil 42 is supplied to the amplifier 41 of which the output energy comprises power of sufficient magnitude and of the proper phase that when it is applied to the mixers 33 and 34 where, in conjunction with the output of coils 25 and 26, energy is supplied to the motors 39 and 40 whereby such motors operate in the proper direction to effect alignment with the total magnetic field to be measured.

In a similar manner a portion of the output from the amplifier 41 is utilized, as coordinated by the mixer 35 from electromotive force generated in the inductor 5, to supply energy to the motor 22 so that the rheostat 21 is adjusted to effect complete neutralization of the magnetic field in the space occupied by the inductor. The variation in the neutralizing field is indicated by the recorder 23 and in this manner variations in the field under observation are made apparent.

A practical structure embodying the invention thus far explained by reference to Fig. 1, is shown in Figs. 2 to 5 inclusive. Such embodiment comprises a gimbal mounted unit 45 having an inner frame or housing 46 rotatably mounted upon stub shafts 47, 48 in the sides of the yoke 49 which is in turn mounted to rotate about hollow shafts 50, 51 journaled in the upper ends of the standards 52 and 53.

The shaft 6 is mounted to oscillate within the housing 46 and carries thereon the inductor 5 which comprises a plurality of turns of wire of which the ends pass outwardly by way of cable 55 passing through stub shaft 47 for connection to amplifier 8 as already explained.

Also mounted upon the shaft 6 is field coil 25 and outwardly of the housing in the projection 56, is the phasing coil 42.

As previously indicated, the field coil 25 is likewise mounted upon the shaft 6 whereby each of the coils 5, 25 and 42 move with the shaft and about the axis thereof.

The coil 26 is mounted upon pivots 27 within housing 46 and is connected by a leaf 44 to the coil assembly therebelow on shaft 6 so that oscillation of the assembly effects oscillation of this coil but about an axis which extends transversely of the shaft 6.

The stub shaft 48 is hollow and receives the drive shaft 54 having pulley 57 on its outer end driven by belt 58 passing over pulleys 59, on the yoke 49, and thence over inner pulley 60 on shaft 61 passing through the hollow shaft 51. Pulley 62 on the outer end of shaft 61 is driven constantly through belt 63 from a suitable source of power (not shown) and in this manner the drive shaft 54 is driven at any suitable and preselected speed. In one physical embodiment it has been found satisfactory to drive this mechanism at such a rate that the coils are oscillated approximately 2,000 times per minute. It is to be understood, of course, that the specific illustration as to frequency of oscillation that may be used is illustrative and not by way of limitation.

The shaft 6 has transverse extensions centrally of the housing 46 engaged by pivot pins or screws 65 in the upper ends of the arms 66 on a yoke 67 having a depending leg 68 which enters a bearing 69 eccentrically mounted in the head 70 secured on the inner end of the drive shaft 54.

It seems apparent that when the drive shaft 54, and the head 70, are driven in the manner already explained the various coils 5, 25, 26 and 42 will be oscillated about their respective axes whereby alternating electromotive forces will be generated in these coils to be utilized in the manner to be more fully explained.

It is intended that the mean plane of the coil 5 shall at all times be maintained in the plane of the earth's magnetic field so that oscillation of the coil will cut the residual of such field at right angles whereby the electromotive force generated in the coil shall be a measure of the vector field at that point. This is the purpose of the gimbal mounting above explained. Desired orientation of the unit 45 within the earth's magnetic is effected in a manner now described.

A pulley 75 driven through belt 76 by reversible motor 39 effects a drive through shafts 74, 77, bevel gear 78 and belt 79 which passes around the housing 46 whereby such housing is oriented about the axis formed by the stub shafts 47 and 48. Similarly, the entire unit 45 is oriented about the axis formed by hollow shafts 50, 51 by means of a belt 80 passing over pulley 81 which is integral with the yoke 49. It is thus seen that desired orientation of the housing 46 may be had for any movement of the support to which the standards 52, 53 are secured or for any variation in the direction of the earth's total magnetic field.

As above indicated, orientation of the device shall be such that the conductors of the oscillating inductor 5 shall move transversely of the earth's magnetic field so that the maximum electromotive force shall be generated in the inductors to provide maximum sensitivity. Hence the earth's magnetic field is normal to the plane of the paper in each of Figs. 2 and 4 of the drawings. Furthermore, the earth's field proximate the inductor is normally neutralized and hence any field cut by the inductor at a given instant is that resulting from a change in magnetic conditions as the device is moved from point to point.

The operation of the device above described and comprising an embodiment of the invention is believed apparent. By way of summary and supplementation it will be assumed that the device is desirably located within or upon a suitable means of transport such as a land vehicle, a water borne vessel or aircraft and that the various elements are energized and the unit 45 is oriented within the earth's field.

The rheostat 16 is of course adjusted for substantially complete neutralization of the earth's field and the effort produced by the principal coils 12 is maintained constant by use of the potentiometer 17. Thereafter, any electromotive force generated in the inductor 5 from cutting of residual field will initiate energization of the motor 22 which will in turn adjust rheostat 21 to provide sufficient change in current in the supplemental coils 13 to effect and maintain complete neutralization of the earth's field. The indication or record of the instrument 23 thus provides an information of the changes in the earth's field as the device is moved from point to point over the area under observation. In this manner anomalous conditions within the area are made apparent.

It is understood of course that proper orientation of the unit 45 is constantly maintained through operation of the motors 39, 40 controlled by means of the electromotive force generated in the phasing coil 42 in conjunction with the electromotive forces generated in the field coils 25 and 26 as above explained.

Inasmuch as minute changes in a magnetic field are to be measured in accordance with the invention, it is to be understood that non-magnetic or diamagnetic materials will be used, where necessary, in a structure by means of which the invention is practiced, such selection of suitable material being within the province of the skilled artisan and hence specific description thereof being deemed unnecessary.

Broadly the invention comprehends a total field magnetometer capable of measuring, with a high degree of precision and facility, the variations of a magnetic field in which the device is positioned.

The invention claimed is:

1. A magnetometer comprising, an inductor, a phasing coil movable in synchronism with said inductor, means for moving said inductor and phasing coil to periodically cut the earth's magnetic field, means for neutralizing the earth's magnetic field within a space including said inductor, and means for measurably varying said last mentioned means to compensate for the point-to-point variations in the earth's magnetic field, said last mentioned means being controlled by the electromotive force generated in said inductor and in said phasing coil.

2. A magnetometer comprising, an inductor, a phasing coil movable in synchronism with said inductor, means for moving said inductor and phasing coil to periodically cut the earth's magnetic field, means for applying a magnetic field in a space including said inductor to substantially neutralize the earth's magnetic field in such space, and additional means for measurably varying the neutralizing field to completely neutralize and to provide a measure of the point-to-point variation in the earth's magnetic field, said last mentioned means being operable by the electromotive force generated in said phasing coil and in said inductor.

3. A magnetometer comprising, an inductor, a phasing coil movable in synchronism with said inductor, a pair of field coils proximate said inductor and movable about axes lying in intersecting planes, means for moving said inductor to periodically cut the earth's magnetic field, means for applying a magnetic field in a space including said indicator to substantially neutralize the earth's magnetic field in such space, means for measurably varying the neutralizing field to completely neutralize and to provide a measure of the point-to-point variation in the earth's magnetic field and additional means for orienting the inductor in space to move in a direction so that it may cut the total earth's magnetic field, said last mentioned means being controlled by the electromotive force generated in said field coils and phasing coil.

4. A magnetometer comprising, an inductor, a phasing coil movable in synchronism with said inductor, a pair of field coils proximate said inductor and movable about axes lying in intersecting planes, means for moving said inductor and field coils to cut the earth's magnetic field, means for applying a neutralizing field in a space including each of said coils but excluding said phasing coil, means responsive to the electromotive force generated in said inductor and said phasing coil for measurably controlling the energization of said neutralizing means to offset point-to-point variations in the earth's magnetic field, and additional means energized by said field coils and said phasing coil for orienting the inductor to cut the earth's total magnetic field.

5. A magnetometer comprising, an inductor, a pair of field coils proximate said inductor and movable about axes lying within intersecting planes, means for moving said inductor and field coils to cut the earth's magnetic field, means for measurably applying a neutralizing field in a space including each of said coils, a phasing coil positioned exteriorly of said neutralized space and movable in synchronism with said inductor, and means responsive to the electromotive force generated in said phasing coil and the electromotive force generated in said field coils for orienting said inductor to cut the residual of the total earth's magnetic field.

6. A magnetometer comprising, an inductor coil, a phasing coil movable in synchronism with said inductor, means for oscillating said inductor and phase coils in synchronism, means for applying a neutralizing field within a space including said inductor coil, means responsive to the residual field within said space and to the electromotive force generated by said phasing coil to orient said inductor coil so that the conductors thereof move substantially transversely of the plane of the earth's magnetic field, and means for measuring variations in the neutralizing effort as a measure in the point-to-point variation in the earth's magnetic field.

7. A magnetometer for traversing the earth's surface and continuously measuring variations in the strength of the earth's magnetic field comprising, a housing universally mounted for predetermined orientation relative to the earth's magnetic field, an inductor movably mounted within said housing, a phasing coil connected to said inductor to move in synchronism therewith, means for maintaining orientation of said housing so that movement of the inductor is substantially at right angles to the earth's magnetic field, and means for applying a measurable magnetic field in the vicinity of the inductor to neutralize the earth's magnetic field in the space occupied by the inductor, said last mentioned means being operable by the electromotive force generated by said phasing coil and inductor.

8. A magnetometer for traversing the earth's surface and continuously measuring variations in the strength of the earth's magnetic field comprising, an inductor, a phasing coil movable in synchronism with said inductor and creating an electromotive force, means for moving said inductor and phasing coil, support means for the inductor constructed and arranged so that movement of the inductor is substantially at right angles to the direction of the total earth's magnetic field, and additional inductor means generating an electromotive force which cooperates with the electromotive force generated by said phasing coil to maintain said support means in a predetermined orientation relative to the direction of the earth's magnetic field.

9. A magnetometer comprising, an inductor, a phasing coil spaced from said inductor and movable to generate an electromotive force, a pair of coils proximate said inductor, a source of electrical energy for said coils to neutralize the earth's field within a space including the inductor but excluding said phasing coil, means for moving said inductor to periodically cut the residual earth's field, and means operable by the electromotive force generated in said inductor and said phasing coil for varying the energization of said coils to effect complete neutralization of the earth's field at the inductor.

10. A magnetometer comprising an inductor, a pair of field coils proximate said inductor and movable about axes lying in intersecting planes, means for oscillating said inductor about an axis to cut lines of force and generate an electromotive force therein, a phasing coil movable in synchronism with said inductor, and means responsive to the electromotive force generated in the phasing coil and in said field coils for orienting the inductor in a plane whereby said inductor cuts the earth's total field when oscillated by said first mentioned means.

11. A magnetometer comprising an inductor, a phasing coil movable in synchronism with said inductor and creating an electromotive force, a housing mounting said inductor for movement transversely of the earth's magnetic field, neutralizing coils mounted on said housing, means for energizing said coils to neutralize the earth's magnetic field in said housing, said phasing coil being mounted adjacent said housing outside the neutralized field, said means for energizing being controlled by the electromotive force generated by said inductor and phasing coil, and means for measuring the energization of said coils as an indication of variations in the strength of the earth's magnetic field as the inductor is moved from point to point relative to the earth's surface.

EUGENE FROWE.

REFERENCES CITED

The following references are of record in the file of this patent:

UNITED STATES PATENTS

| Number | Name | Date |
|---|---|---|
| 2,124,825 | Machts et al. | July 26, 1938 |
| 2,151,627 | Vacquier | Mar. 21, 1939 |
| 2,406,870 | Vacquier | Sept. 3, 1946 |
| 2,420,580 | Antes | May 13, 1947 |
| 2,421,583 | Stuart | June 3, 1947 |
| 2,447,849 | Fay | Aug. 24, 1948 |
| 2,451,819 | Frosch | Oct. 19, 1948 |
| 2,468,554 | Hull | Apr. 26, 1949 |
| 2,468,968 | Felch et al. | May 3, 1949 |

OTHER REFERENCES

Geophysical Prospecting, A. I. M. M. E. 1932, pages 213 and 214.

Electrical Engineering, July 1947, pages 680 to 685.